(12) United States Patent
Wright

(10) Patent No.: US 8,924,945 B1
(45) Date of Patent: Dec. 30, 2014

(54) MANAGING DEPENDENCIES ON MULTI-THREADED ENVIRONMENT

(71) Applicant: Google Inc., Mountain View, CA (US)

(72) Inventor: Erik Lewis Wright, Outremont (CA)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 13/645,418

(22) Filed: Oct. 4, 2012

(51) Int. Cl.
G06F 9/45 (2006.01)
G06F 9/44 (2006.01)

(52) U.S. Cl.
USPC ........... 717/140; 717/132; 717/133; 717/156; 717/157

(58) Field of Classification Search
CPC ............. G06F 8/20; G06F 8/41; G06F 8/433; G06F 8/443; G06F 11/3466
See application file for complete search history.

(56) References Cited

U.S. PATENT DOCUMENTS

| | | | |
|---|---|---|---|
| 7,620,947 B2 * | 11/2009 | Krishnaswamy | 717/157 |
| 7,784,035 B2 * | 8/2010 | Kahlon et al. | 717/133 |
| 8,468,504 B2 * | 6/2013 | Hassan et al. | 717/140 |
| 8,516,454 B2 * | 8/2013 | Mizrachi et al. | 717/140 |
| 2011/0067018 A1 * | 3/2011 | Kawachiya et al. | 717/156 |
| 2012/0167061 A1 * | 6/2012 | Kirovski et al. | 717/132 |

OTHER PUBLICATIONS

W. Hasselbring, Reverse engineering of dependency graphs via dynamic analysis, Sep. 2011, 2 pages.*
Kejariwal et al., On the efficacy of call graph-level thread-level speculation, Jan. 2010, 2 pages.*
Heffernan et al., Data-Dependency Graph Transformations for Superblock Scheduling, Dec. 2006, 12 pages.*

* cited by examiner

Primary Examiner — Thuy Dao
(74) Attorney, Agent, or Firm — McDermott Will & Emery LLP

(57) ABSTRACT

A computer-implemented method for initializing computer programming elements based on dependency graphs is provided. The method includes determining a dependency graph associated with a computer programming element to be initialized. The method also includes traversing the determined dependency graph, so as to obtain thread information associated with each of the one or more computer programming elements of the determined dependency graph, and determining, based on the obtained thread information associated with each of the computer programming elements, an aggregate thread information of all the computer programming elements of the determined dependency graph. The method further includes generating code which initializes the computer programming element to be initialized based at least on the determined aggregate thread information. Systems and machine-readable media are also provided.

20 Claims, 5 Drawing Sheets

MANAGING DEPENDENCIES ON MULTI-THREADED ENVIRONMENT

BACKGROUND

Currently, in certain computer programming models, computer programming elements (e.g., factories, classes or objects) may depend on other computer programming elements.

SUMMARY

The present disclosure generally relates to managing dependencies of computer programming elements, and more particularly to automatically generating and verifying code for initializing the computer programming elements while taking the dependencies into consideration.

The subject disclosure relates to a computer-implemented method for initializing computer programming elements based on dependency graphs. The method includes determining a dependency graph associated with a computer programming element to be initialized, wherein the dependency graph comprises one or more nodes that define dependency relationships of one or more computer programming elements including the computer programming element to be initialized, and wherein each of the one or more computer programming elements is associated with thread information; traversing the determined dependency graph, so as to obtain the thread information associated with each of the one or more computer programming elements of the determined dependency graph; determining, based on the obtained thread information associated with each of the computer programming elements, an aggregate thread information of all the computer programming elements of the determined dependency graph; and generating code which initializes the computer programming element to be initialized based at least on the determined aggregate thread information.

The subject disclosure also relates to a system for initializing computer programming elements based on dependency graphs. The system includes a memory storing executable instructions and a processor. The processor is coupled to the memory and is configured to execute the stored executable instructions to determine a dependency graph associated with a computer programming element to be initialized, wherein the dependency graph comprises one or more nodes that define dependency relationships of one or more computer programming elements including the computer programming element to be initialized and one or more nodes corresponding to computer programming elements that are dependencies of the computer programming element to be initialized, and wherein each of the one or more computer programming elements is associated with thread information; traverse the determined dependency graph, so as to obtain the thread information associated with each of the one or more computer programming elements of the determined dependency graph; determine, based on the obtained thread information associated with each of the computer programming elements, an aggregate thread information of all the computer programming elements of the determined dependency graph; and generate code which initializes each of the one or more computer programming elements of the determined dependency graph according to the obtained thread information associated with each of the computer programming elements and the determined aggregate thread information.

The subject disclosure further relates to a machine-readable storage medium comprising instructions stored therein, which when executed by processors, cause the processors to perform operations including determining a dependency graph associated with a computer programming element to be initialized, wherein the dependency graph comprises one or more nodes that define dependency relationships of one or more computer programming elements including the computer programming element to be initialized, and wherein each of the one or more computer programming elements is associated with thread information; traversing the determined dependency graph, so as to obtain the thread information associated with each of the one or more computer programming elements of the determined dependency graph; determining, based on the obtained thread information associated with each of the computer programming elements, an aggregate thread information of all the computer programming elements of the determined dependency graph; determining whether the determined aggregate thread information corresponds to a declared thread information of the computer programming element to be initialized; generating, if the determined aggregate thread information does not correspond to the declared thread information, a notification for communicating to a user, the notification indicating that the determined aggregate thread information does not correspond to the declared thread information; and generating, if the determined aggregate thread information corresponds to the declared thread information, code which initializes the computer programming element to be initialized based at least on the determined aggregate thread information.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

Figure 1:
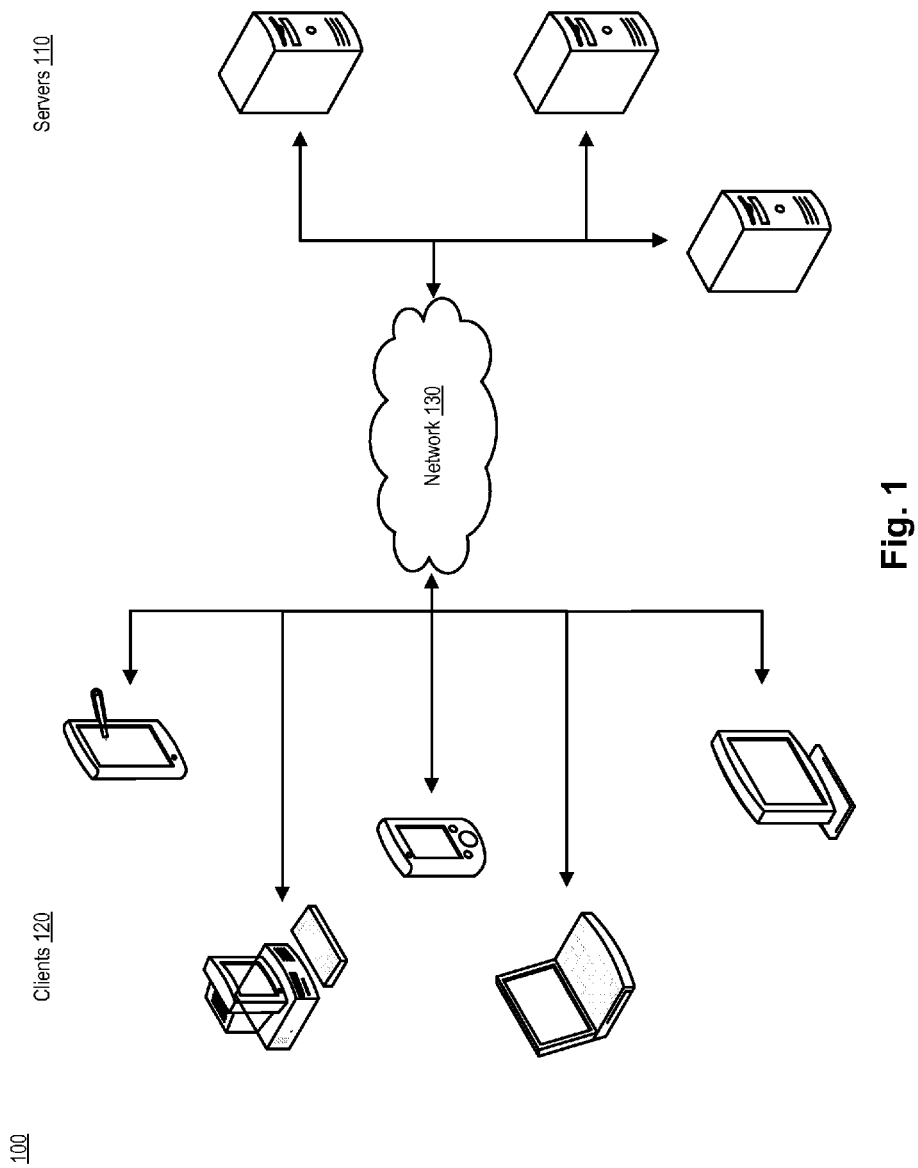
FIG. 1 illustrates an example architecture for initializing computer programming elements based on dependency graphs.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In the dependency injection model of computer programming, or the inversion of control model, computer programming elements (e.g., factories, classes or objects) are developed such that their dependencies are received from outside of the computer programming elements, rather than defining the dependencies within the computer programming element. For example, in creating an object of a hypothetical class bus, the bus object created for the bus class will include wheels and windshield wipers, but will not specify the exact types of wheels or windshield wipers. Rather, the exact types are dependent on other classes or objects which specify the exact types of the wheels and windshield wipers. A computer programming element called a factory may be used to create the classes or objects.

According to various aspects of the subject technology, a method and system for initializing computer programming elements based on dependency graphs is provided.

Computer programming elements (e.g., factories, classes, objects) may be developed such that their specific properties may depend on other programming elements. Such property may include, for example, threadedness. As used herein, "threadedness" refers to a property of the computer programming element which describes the type of thread on which the computer programming elements may be run. The dependency relationships among the various computer programming elements is referred to as a "dependency graph" herein. The computer programming elements may be represented in the dependency graph as individual nodes. Threadedness of the dependency graph may be determined based on the aggregate of the threadedness of each of the nodes.

Specifically, certain computer programming elements such as, for example, objects, may be executed only on a specific type of thread, and an object may have as its dependent object those that may run on different types of thread. For example, an object designated to be executed only on a user interface (UI) thread may have as a dependent object which is designated to be executed only on an input/output (I/O) thread. In such case, the threadedness of the dependency graph for the two objects is determined as asynchronous, as the dependency graph needs to run on two different threads. Whether the dependent object has been instantiated may be found out through a callback function. On the other hand, if both the parent and child objects may be instantiated and run on the UI thread, the threadedness of the dependency graph for the two objects is determined as thread-bound, as the dependency graph can be run on the UI thread synchronously, but asynchronously on other threads. Further, if both the parent and child objects may be instantiated and run on any thread, the threadedness of the dependency graph for the two objects is determined as synchronous.

While the subject disclosure describes managing dependencies of computer programming elements as they relate to the threadedness of factories and objects, it should be noted that the subject technology may apply to other managing dependencies as they relate to other types of properties of other types of computer programming elements.

The threadedness of a computer programming element such as, for example, a factory may include different types of threadedness. Such threadedness may include for example, synchronous, asynchronous or threadbound. A synchronous factory indicates that all of its dependencies (or "depended-upon objects") may be created on a single thread in a non-blocking fashion. An asynchronous factory indicates that some of its dependencies (or "depended-upon objects") cannot be constructed in a non-blocking fashion, and thus may not be created synchronously. For example, communication with a remote service needs to be made before an object may be created. In such case, creation of the object waits until a response is received from the remote service. A threadbound factory indicates that all its dependencies are created on a specific type of thread (e.g., UI thread or I/O thread). An object may be constructed in a non-blocking fashion if it does not depend on any asynchronous operations (including, but not limited to, network requests, disk access, user interaction, or operations that must execute on threads other than the constructing thread).

The factory may be declared as having a certain threadedness (e.g., synchronous, asynchronous, or threadbound). However, the actual threadedness for the factory may be different from the declared threadedness, since the actual threadedness depends on the dependency graph for the factory. If all the computer programming elements in the dependency graph for the factory (e.g., all computer programming elements that the factory ultimately depends on) can be run synchronously on any thread, the actual threadedness of the factory will be synchronous; if some computer programming elements cannot be constructed in a non-blocking fashion (e.g., an object exists in the dependency graph which needs to wait for a response from a remote server), then the actual threadedness is asynchronous; if one thread, but not any thread, can run all elements in the dependency graph (e.g., an object in the dependency graph can only be run on an I/O thread), the actual threadedness is threadbound. If the declared threadedness is different from the actual threadedness, other computer programming elements which rely on the factory's declared threadedness may not function at runtime as intended by the developer, since the developer may have developed other programming elements under the assumption that the declared threadedness of the factory is the actual threadedness.

When a user (e.g., a developer) configures a computer programming element, knowledge as to the specific threadedness of its dependencies may not be required. For example, if a factory is configured to create several objects, the user need not know the threadedness of all the objects the factory creates. Rather, at compile time, the dependency graph corresponding to the factory is checked recursively to determine the threadedness of all the objects that are created by the factory, and the actual aggregate threadedness for the factory is determined. Based on the threadedness of all the objects and the aggregate threadedness, code which, when executed at run time, correctly creates all the objects in the dependency graph is automatically created. Also, at compile time, determination may be made as to the whether the aggregate threadedness corresponds to the declared threadedness.

The aggregate threadedness is determined by determining the most synchronous possible threadedness for all the objects in the dependency graph. For example, the dependency graph for a factory would include the factory as a root node and have as depended-upon nodes the objects which the factory is configured to instantiate. The objects that are to be created by the factory may have other dependencies, and such dependencies would be presented as further depended-upon nodes. The actual aggregate threadedness of the dependency graph corresponding to the factory at the root node is the most synchronous possible threadedness for all the dependent nodes.

Specifically, each object in the dependency graph may or may not be bound to a thread, or may have a timing constraint (e.g., a response from a remote service is required). Thus, when a command for creating an object using the factory (e.g., a "get" method of the factory) is compiled, all the dependee nodes (depended-upon-nodes) in the dependency graph for the factory are recursively checked to determine whether any thread may run all the objects (synchronous), no thread exists which may run all the objects (asynchronous), or a single thread exists which may run all the objects (thread-bound). Based on such determination, code for actually implementing the factory is automatically generated which accounts for the threadedness of its dependent objects such that the code may be properly executed at run time.

For the factory or other computer programming element for which the implementing code is generated during compile time as discussed above, if the threadedness of the corresponding generated code matches the declared threadedness, then the compile succeeds. If the declared threadedness of the factory is does not match the threadedness of the generated code, then the compile would fail, and necessary adjustments may be made such that the correct threadedness may be declared.

In an aspect of the subject technology, management of destruction of computer programming elements corresponding to a node of a dependency graph is also provided. When instructions for destroying (e.g., a destructor) an object corresponding to a node of a dependency graph is compiled, the dependency graph for the node is recursively traversed to identify a least depended-upon node. Beginning from the least dependent node, the dependency graph is recursively traversed in the reverse order to destroy the respective corresponding objects from the least dependent node to the most dependent node, until all computer programming elements corresponding to the nodes in the dependency graph for which destruction is sought is destroyed.

FIG. 1 illustrates an example architecture 100 for initializing computer programming elements based on dependency graphs. The architecture 100 includes servers 110. The servers 110 may be any device having a processor and a memory for managing dependencies on a multi-threaded environment. The servers 110 may be a single server or may be multiple servers.

The architecture may also include client terminals 120, and may be connected with the servers 110. The client terminals 120 may be connected locally with the servers 110, or may be connected over a network 130. The servers 110 may also have communications capability for communicating with the clients 120 over the network 130. Each of the client terminals 120 may interact with users and communicate with the servers 110 to provide instructions for managing dependencies on a multi-threaded environment. The clients 120 may be, for example, mobile devices such as smartphones, tablet computers, PDAs, laptop computers, navigation systems, desktop computers, and televisions having processors capable providing instructions to the servers 110.

The network 130 may include, for example, any one or more of a personal area network (PAN), a local area network (LAN), a campus area network (CAN), a metropolitan area network (MAN), a wide area network (WAN), a broadband network (BBN), the Internet, and the like. Further, the network 130 can include, but is not limited to, any one or more of the following network topologies, including a bus network, a star network, a ring network, a mesh network, a star-bus network, tree or hierarchical network, and the like.

Figure 2:
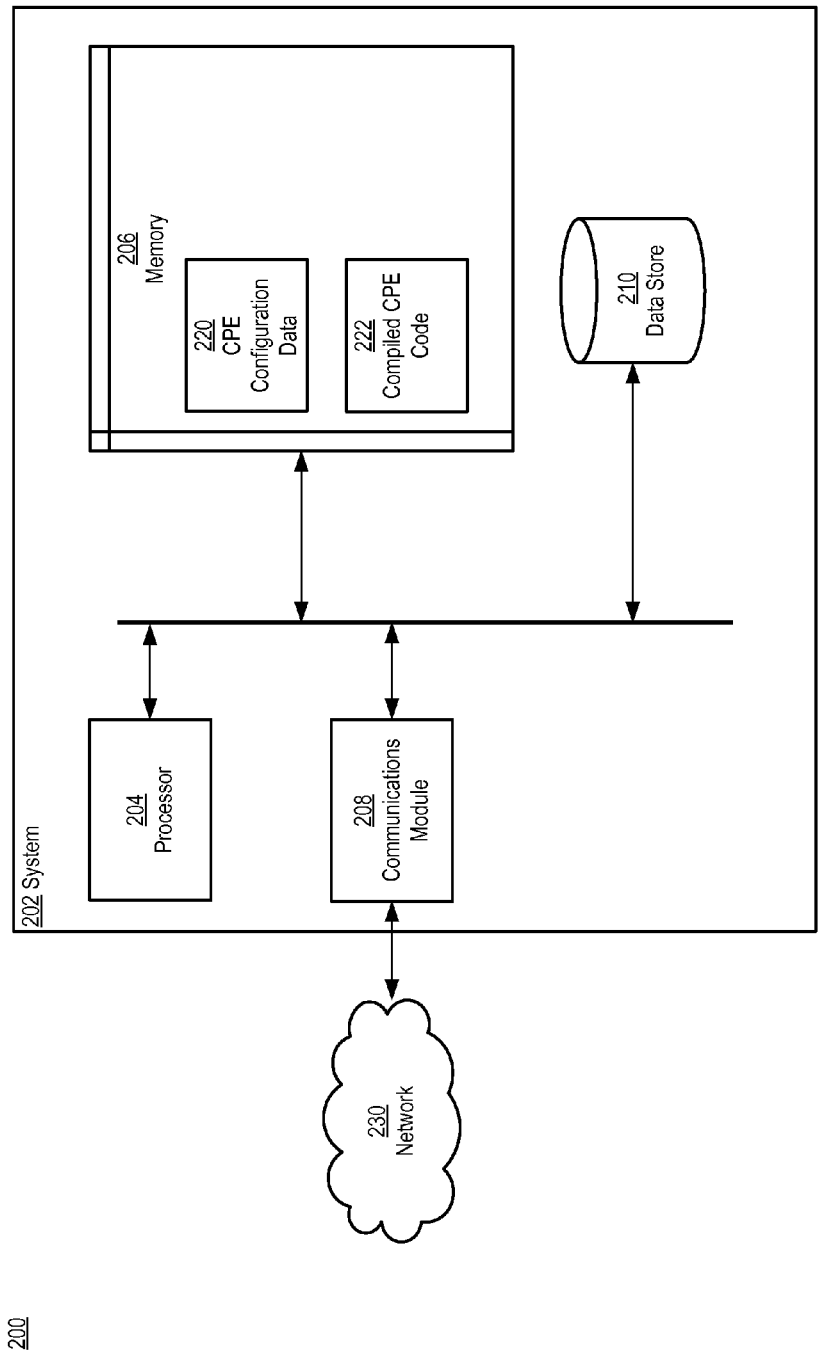
FIG. 2 is a block diagram illustrating an example system for initializing computer programming elements based on dependency graphs.

FIG. 2 is a block diagram 200 illustrating an example system 202 for initializing computer programming elements based on dependency graphs. The system 202 may be implemented, for example, at servers 110, or spread across servers 110 and client terminals 120. The system 202 includes a processor 204 and a memory 206. The system 202 may also include a communications module 208, and may be connected to the network 230 via the communications module 208. The network 230 may be, for example, the network 130. The communications module 208 is configured to interface with the network 230 to send and receive information, such as data, requests, responses, and commands to other devices (e.g., clients 120) or systems on the network 230. The communications module 208 may be, for example, modems, Ethernet cards or mobile broadband adaptors.

The memory 206 can include computer programming element (CPE) configuration data 220. CPE configuration data 220 may be received, for example, from a client terminal 120. The CPE configuration data 220 may also be received from a developer through input devices (not shown) locally connected to the system 202. The CPE configuration data 220 includes information for configuring CPEs for implementing computer software such as, for example, computer applications (e.g. word processor, or web browsers) or operating systems (e.g., mobile operating system). The CPE configuration data 220 may be part of source code for the computer software. The memory 206 may also include compiled CPE code 222. The compiled CPE code 222 may be generated based on the CPE configuration data 220 and may include information for executing various functionalities provided by the CPEs associated with the CPE configuration data 220.

System 202 may also include a data store 210, which may also store the CPE configuration data 220 and/or the compiled CPE code 222. The data store 210 may be integrated with the memory 206, or may be independent from the memory and be in communication with the processor 204 and the memory. The data store 210 may also be implemented to be independent from the system 202 and in communication with the system.

The processor 204 is configured to execute instructions, such as instructions physically coded into the processor, instructions received in the form of software from the memory 206, or a combination of both. For example, the processor 204 is configured to execute instructions to determine a dependency graph associated with a CPE to be initialized. The dependency graph comprises one or more nodes that define dependency relationships of one or more CPEs including the CPE to be initialized, and each of the one or more CPEs is associated with thread information. The dependency graph may be determined based on the CPE configuration data 220. The processor 204 is also configured to traverse the determined dependency graph, so as to obtain the thread information associated with each of the one or more CPEs of the determined dependency graph and determine, based on the obtained thread information associated with each of the CPEs, an aggregate thread information of all the CPEs of the determined dependency graph. The processor 204 is further configured to generate the compiled CPE code 222 based at least on the determined aggregate thread information.

Figure 3:
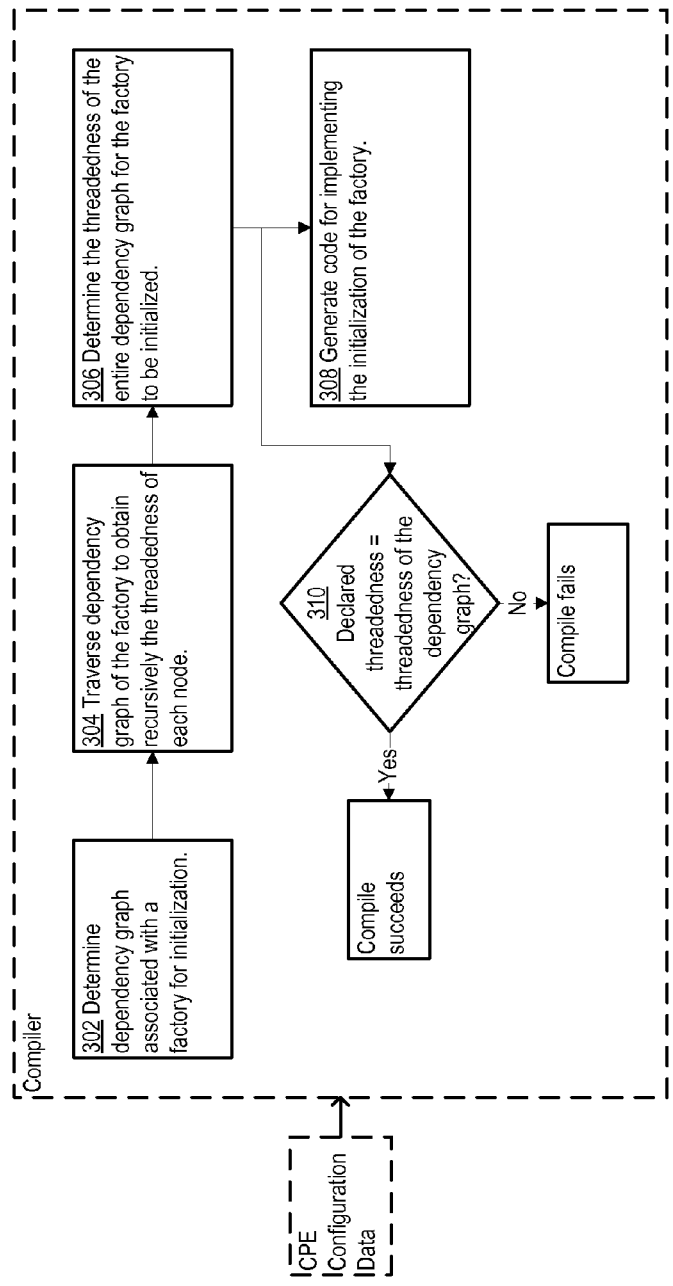
FIG. 3 is a diagram illustrating example operations for initializing computer programming elements based on dependency graphs.

FIG. 3 is a diagram 300 illustrating example operations for initializing computer programming elements based on dependency graphs. The operations may be performed, for example, by the system 202.

Computer programming element (CPE) configuration data (e.g., CPE configuration data 220) may be provided by, for example, a developer. The CPE configuration data may be, or may be part of, source code for a computer software and may contain information for configuring the properties CPEs. For example, the CPE configuration data may declare the threadedness of a factory, and may also provide information on any CPEs such as other factories or objects, on which the factory may depend. The CPE configuration data may also include information for configuring other CPEs which may be utilized by the computer software. The CPE may also make reference to other types of data, such as CPE templates, which may be used in configuring the CPEs. The CPE configuration data and/or the source code for the computer software may also include information which identifies the CPE that are to be initialized. For example, the source code may include a command which provides for creating a CPE (e.g., "Create-Factory" command or a "get" command). The CPEs that are to be created by such commands may be identified as the CPEs to be initialized.

Diagram 300 shows operations for initializing a single CPE, a factory, when the CPE configuration data is processed (e.g., compiled at a compiler) to produce code which may be executed. However, the subject technology may apply to initializing multiple CPEs, and may apply to stages of development and operation of computer software.

CPE configuration data which includes configuration data for the factory is received from a user (e.g., a developer) or may be received from another system or device such as, for example client terminals 120. At operation 302, a dependency graph associated with a factory to be initialized may be determined. A factory is initialized, for example, if the CPE configuration data may contain instructions to create a factory for building an object. The dependency graph associated with the factory may also be determined from the CPE configuration data. As discussed above, the CPE configuration data includes information for configuring CPEs that may be utilized by the computer software. For example, for a factory A which will be initialized, CPE configuration data may configure factory A such that factory A creates (initializes) another factory B, which in turn creates an object O. Based on such configuration information, the dependency graph for factory A may be determined—A node corresponding to factory A will correspond to a root node, with a node for factory B depending from the root node, and a node for object O depending from the node for factory B.

At operation 304, the determined dependency graph is traversed to obtain the threadedness of each of factory A, factory B, and object O. The portions of the CPE configuration data corresponding to each of the factory A, factory B and object O may include information on the threadedness of the respective CPE. For example, the portion configuring factory A may include a declaration declaring factory A as "threadbound." The portion configuring factory B may also declare factory B as "synchronous." The portion configuring object O may declare the object as being bound to an I/O thread ("threadbound"). While recursively traversing the node to obtain the threadedness of each of the nodes in the dependency graph, an aggregate threadedness may be determined at each level of recursion. Aggregate threadedness is the most synchronous possible threadedness for a given node and all of its dependent nodes. In other words, if all nodes are synchronous, then the aggregate is also synchronous. If one node is threadbound and the rest are synchronous, the aggregate threadedness is threadbound. If one node is asynchronous or two nodes are threadbound to different threads, then the aggregate threadedness is asynchronous. For example, at the node corresponding to factory B, the aggregate threadedness of both factory B and object O is I/O threadbound since one node (object O) is bound to the I/O thread and the rest (factory B) is synchronous.

At operation 306, when all of the nodes are traversed, the aggregate threadedness for the entire dependency graph associated with the factory to be initialized may be determined. In the foregoing example where factory A is to be initialized, the aggregate threadedness is I/O threadbound, since object O is I/O threadbound and factory B synchronous and thus may be run on any thread. At operation 308, code for implementing the initialization of the factory to be initialized is automatically generated. The generated code takes into account the threadedness information and dependency of all the CPEs of the dependency graph determined at operation 302, such that the CPEs are initialized on the correct thread in the correct order. The generated code also ensures that the CPE to be initialized is not initialized until all of its dependent CPEs have been initialized, or may be initialized synchronously. In the foregoing example, the generated code includes instructions which first initializes object O on the I/O thread, and also initializes factory B and factory A on the I/O thread.

In addition, after operation 306, determination may be made at operation 310 as to whether the determined aggregate threadedness corresponds to the declared threadedness for the factory to be initialized. If not, compilation may fail, or a message may be generated for communicating to the developer that the determined aggregate threadedness and the declared threadedness do not correspond to each other. For example, the determined aggregate threadedness for factory A is threadbound, which matches its declared threadedness. Therefore, the compile may succeed. However, if object O had been an asynchronous object (e.g., a response from a remote service is needed before the object may be initialized), the aggregate threadedness would have been determined as being asynchronous. Therefore, the in such case the declared threadedness for factory A (threadbound) and the determined aggregate threadedness (asynchronous) would not correspond to each other, and the compile may fail. Operation 310 may be performed concurrently with, before, or after operation 308.

In an aspect of the subject technology, the CPE configuration data and/or the source code for the computer software may also include information which identify initialized CPEs that are to be destroyed. For example, the source code may include a command which provides for destroying a CPE that has been already initialized (e.g., a destructor command). Management of destruction of such CPEs may also be provided. A dependency graph associated with a CPE to be destroyed is determined based on the CPE configuration data, and the determined dependency graph is traversed to identify a least depended-upon node. For example, the dependency graph may include a root node which corresponds to the CPE to be destroyed. The root node may have two dependent nodes C and D, and each nodes C and D may have nodes E and F, respectively as their dependent nodes. If nodes E and F do not have any further dependent nodes, the nodes E and F may be determined as the least dependent nodes. Starting with the determined least dependent node, the nodes of the dependency graph are destroyed while traversing the node in the reverse order. For example, the least dependent nodes E and F are first destroyed, and then nodes C and D are destroyed, since after nodes E and F are destroyed, nodes C and D become the least dependent nodes. After nodes C and D are destroyed, the root node is destroyed, thus completing the destruction of the CPE to be destroyed.

Figure 4:
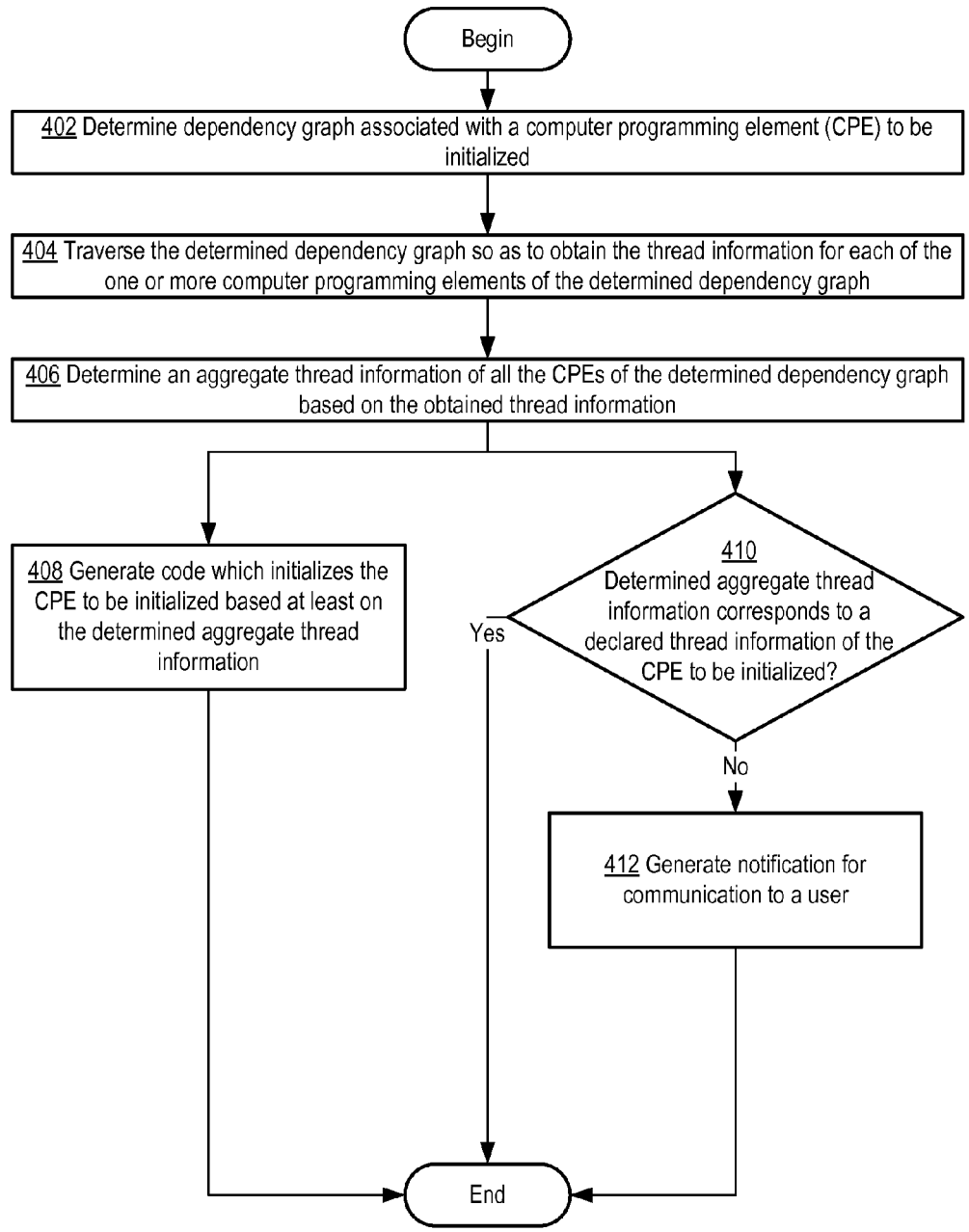
FIG. 4 illustrates an example flow diagram of example processes for initializing computer programming elements based on dependency graphs.

FIG. 4 illustrates an example information flow diagram of example processes 400 for initializing computer programming elements based on dependency graphs. The processes of FIG. 4 may be performed by, for example, system 202. However, the operations of FIG. 4 are not limited to such a system, and may be performed using other systems/configurations.

Process 400 begins at block 402 where a dependency graph associated with a computer programming element (CPE) to be initialized is determined. The dependency graph comprises one or more nodes that define dependency relationships of one or more computer programming elements, and each of the one or more CPEs is associated with thread information. The thread information may indicate whether the CPE is synchronous, asynchronous, or threadbound. At block 404, the determined dependency graph is traversed, so as to obtain the thread information for each of the one or more computer programming elements of the dependency graph determined at block 402.

At block 406, an aggregate thread information of all the CPEs of the determined dependency graph is determined based on the thread information obtained at block 404, and at block 408, code which initializes the CPE to be initialized is generated based at least on the aggregate thread information that is determined at block 406. At block 410, a determination is made whether the aggregate thread information determined at block 406 corresponds to a declared thread information of the CPE to be initialized. If the declared thread information does not correspond to the determined aggregate thread information for the CPE to be initialized, at block 412, a notification is generated for communicating to a user (e.g., a developer). The notification indicates that the determined aggregate thread information does not correspond to the declared thread information for the CPE to be initialized.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include, but not limited to, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
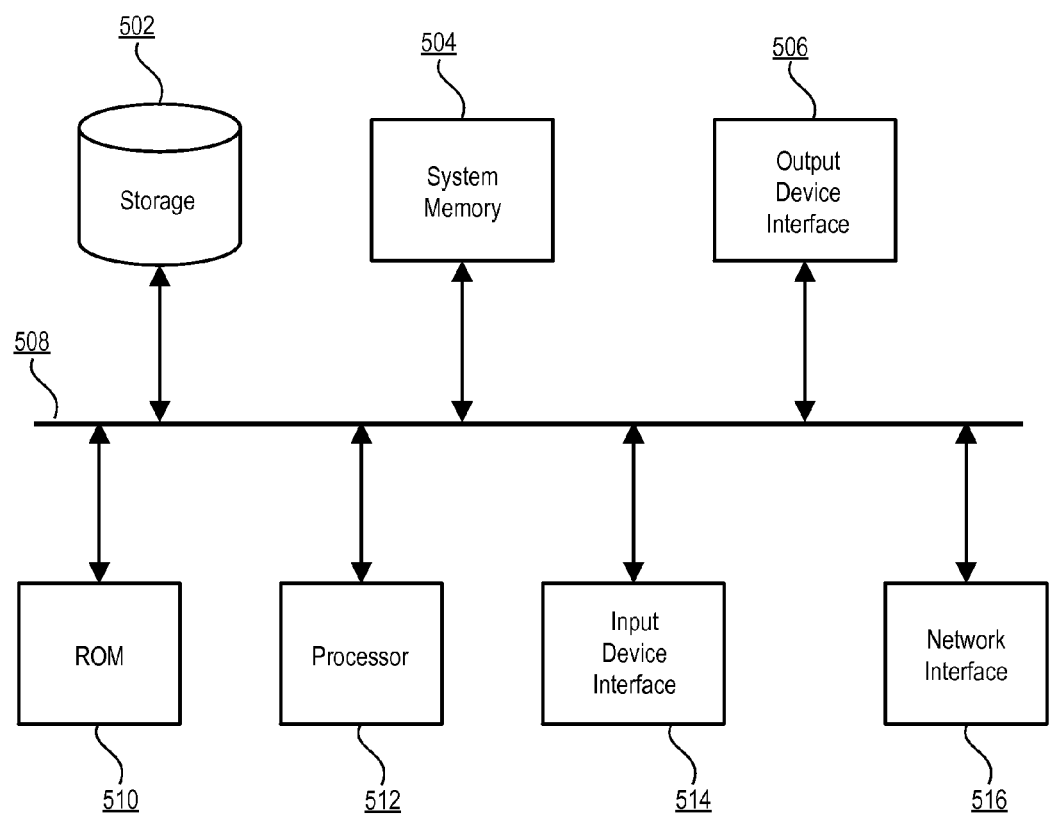
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject technology described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

Aspects of the subject technology described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that not all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for initializing computer programming elements based on dependency graphs, the method comprising:
   determining a dependency graph associated with a computer programming element to be initialized, wherein the dependency graph comprises one or more nodes that define dependency relationships of one or more computer programming elements including the computer programming element to be initialized, and wherein each of the one or more computer programming elements is associated with thread information;
   traversing the determined dependency graph, so as to obtain the thread information associated with each of the one or more computer programming elements of the determined dependency graph;
   determining, based on the obtained thread information associated with each of the computer programming elements, an aggregate thread information of all the computer programming elements of the determined dependency graph;
   generating code which initializes the computer programming element to be initialized based at least on the determined aggregate thread information;
   determining whether the determined aggregate thread information corresponds to a declared thread information of the computer programming element to be initialized; and
   generating, if the determined aggregate thread information does not correspond to the declared thread information, a notification for communicating to a user, the notification indicating that the determined aggregate thread information does not correspond to the declared thread information.

2. The method of claim 1, wherein the generated code comprises instructions for initializing each of the one or more computer programming elements of the determined dependency graph according to the obtained thread information associated with each of the computer programming elements and the determined aggregate thread information.

3. The method of claim 1, wherein the determined dependency graph comprises a node corresponding to the computer programming element to be initialized and one or more nodes corresponding to computer programming elements that are dependees of the computer programming element to be initialized.

4. The method of claim 1, wherein the computer programming element to be initialized is a factory.

5. The method of claim 1, wherein the computer programming element to be initialized is an object.

6. The method of claim 1, wherein the obtained thread information identifies whether a computer programming element is synchronous, asynchronous, or threadbound.

7. The method of claim 1, wherein the dependency graph is determined based on computer programming element configuration data, wherein the computer programming configuration data includes information for configuring properties of the one or more computer programming elements.

8. The method of claim 1, further comprising:
   determining a dependency graph for destruction associated with a computer programming element to be destroyed;
   traversing the determined dependency graph for destruction, so as to determine a least-depended-upon node of the determined dependency graph for destruction; and
   generating code which destroys dependency graph for destruction beginning from the determined least-depended-upon node.

9. The method of claim 1, further comprising executing the generated code which initializes the computer programming element to be initialized.

10. A system for initializing computer programming elements based on dependency graphs, comprising:
    a memory storing executable instructions; and
    a processor coupled to the memory and configured to execute the stored executable instructions to:
       determine a dependency graph associated with a computer programming element to be initialized, wherein the dependency graph comprises one or more nodes that define dependency relationships of one or more computer programming elements including the computer programming element to be initialized, and wherein each of the one or more computer programming elements is associated with thread information;
       traverse the determined dependency graph, so as to obtain the thread information associated with each of the one or more computer programming elements of the determined dependency graph;
       determine, based on the obtained thread information associated with each of the computer programming elements, an aggregate thread information of all the computer programming elements of the determined dependency graph;
       generate code which initializes the computer programming element to be initialized based at least on the determined aggregate thread information;
       determine whether the determined aggregate thread information corresponds to a declared thread information of the computer programming element to be initialized; and
       generate, if the determined aggregate thread information does not correspond to the declared thread information, a notification for communicating to a user, the notification indicating that the determined aggregate thread information does not correspond to the declared thread information.

11. The system of claim 10, wherein the computer programming element to be initialized is a factory.

12. The system of claim 10, wherein the computer programming element to be initialized is an object.

13. The system of claim 10, wherein the obtained thread information identifies whether a computer programming element is synchronous, asynchronous, or threadbound.

14. The system of claim 10, wherein the dependency graph is determined based on computer programming element configuration data, wherein the computer programming configuration data includes information for configuring properties of the one or more computer programming elements.

15. The system of claim 10, wherein the processor is further configured to:
   determine a dependency graph for destruction associated with a computer programming element to be destroyed;
   traverse the determined dependency graph for destruction, so as to determine a least-depended-upon node of the determined dependency graph for destruction; and
   generate code which destroys dependency graph for destruction beginning from the determined least-depended-upon node.

16. The system of claim 10, wherein the dependency graph further comprises one or more nodes corresponding to computer programming elements that are dependencies of the computer programming element to be initialized.

17. A non-transitory machine-readable storage medium comprising instructions stored therein, which when executed by processors, cause the processors to perform operations comprising:
   determining a dependency graph associated with a computer programming element to be initialized, wherein the dependency graph comprises one or more nodes that define dependency relationships of one or more computer programming elements including the computer programming element to be initialized, and wherein each of the one or more computer programming elements is associated with thread information;
   traversing the determined dependency graph, so as to obtain the thread information associated with each of the one or more computer programming elements of the determined dependency graph;
   determining, based on the obtained thread information associated with each of the computer programming elements, an aggregate thread information of all the computer programming elements of the determined dependency graph;
   generating code which initializes the computer programming element to be initialized based at least on the determined aggregate thread information;
   determining whether the determined aggregate thread information corresponds to a declared thread information of the computer programming element to be initialized; and
   generating, if the determined aggregate thread information does not correspond to the declared thread information, a notification for communicating to a user, the notification indicating that the determined aggregate thread information does not correspond to the declared thread information.

18. The non-transitory machine-readable storage medium of claim 17, wherein the dependency graph is determined based on computer programming element configuration data, wherein the computer programming configuration data includes information for configuring properties of the one or more computer programming elements.

19. The non-transitory machine-readable storage medium of claim 17, wherein the instruction further cause the processors to perform operations comprising:
   determining a dependency graph for destruction associated with a computer programming element to be destroyed;
   traversing the determined dependency graph for destruction, so as to determine a least-depended-upon node of the determined dependency graph for destruction; and
   generating code which destroys dependency graph for destruction beginning from the determined least-depended-upon node.

20. The non-transitory machine-readable storage medium of claim 17, wherein the determined dependency graph comprises a node corresponding to the computer programming element to be initialized and one or more nodes corresponding to computer programming elements that are dependees of the computer programming element to be initialized.

* * * * *